United States Patent [19]
Inoue et al.

[11] 3,742,458
[45] June 26, 1973

[54] MEMORY PROTECTION SYSTEM PROVIDING FIXED, CONDITIONAL AND FREE MEMORY PORTIONS CORRESPONDING TO RANGES OF MEMORY ADDRESS NUMBERS

[75] Inventors: Tadanari Inoue; Shigeru Yamamoto; Yutaka Wakasa, all of Tokyo, Japan

[73] Assignee: Yokogawa Electric Works, Ltd., Tokyo, Japan

[22] Filed: Sept. 10, 1971

[21] Appl. No.: 179,293

[30] Foreign Application Priority Data

Sept. 30, 1970 Japan ............................ 45/86031

[52] U.S. Cl. ............................................ 340/172.5
[51] Int. Cl. ............................................ G06f 11/00
[58] Field of Search ................................ 340/172.5

[56] References Cited

UNITED STATES PATENTS

| | | | |
|---|---|---|---|
| 3,264,615 | 8/1966 | Case et al. | 340/172.5 |
| 3,284,776 | 11/1966 | Freedman | 340/172.5 |
| 3,328,768 | 6/1967 | Amdahl et al. | 340/172.5 |
| 3,573,855 | 4/1971 | Cragon et al. | 340/172.5 |
| R27,251 | 12/1971 | Amdahl et al. | 340/172.5 |
| 3,263,218 | 7/1966 | Anderson | 340/172.5 |
| 3,271,744 | 9/1966 | Petersen et al. | 340/172.5 |
| 3,340,539 | 9/1967 | Sims, Jr. | 340/172.5 X |
| 3,377,624 | 4/1968 | Nelson et al. | 340/172.5 |
| 3,562,717 | 2/1971 | Harmon et al. | 340/172.5 |

*Primary Examiner*—Raulfe B. Zache
*Assistant Examiner*—Melvin B. Chapnick
*Attorney*—Bryan, Parmelee, Johnson & Bollinger

[57] ABSTRACT

A method and apparatus for flexible protection against overwriting and destruction of the contents of selected portions of a computer memory device formed of a multiplicity of memory units. Each memory unit is assigned a unique memory address number which serves to identify the memory unit in instructions to write data into the memory. The address numbers are segregated into ranges of numbers defining separate memory portions to be protected, with the numbers at the limits or boundaries of the ranges being entered in registers which can be reset to flexibly determine the protected ranges. The memory device is separated in this fashion into three different portions: one permitting free writing access to the memory units, one withholding all writing access to the memory units, and one being conditioned to grant or withhold writing access according to the setting of a device such as flip-flop which can be arranged for manual or programable control. Whenever an instruction to alter a memory unit arises, the associated address number is entered in a register and compared by means of digital comparators with the range boundary numbers in their registers. Gate means grant or withhold access to the memory unit in accordance with the comparison, thereby controlling the insertion of data into each memory unit and providing protection for selected portions of the memory device.

4 Claims, 3 Drawing Figures

Patented June 26, 1973 3,742,458

2 Sheets-Sheet 1

*Bryan Parmelee Johnson & Bollinger*
ATTORNEYS

Bryan Parmelee Johnson & Bollinger
ATTORNEYS

MEMORY PROTECTION SYSTEM PROVIDING FIXED, CONDITIONAL AND FREE MEMORY PORTIONS CORRESPONDING TO RANGES OF MEMORY ADDRESS NUMBERS

BACKGROUND OF THE INVENTION

1. Field of the Invention

This invention relates to memory devices of the type forming the information and data storage component in an electronic computer. Such memory devices are formed of a multiplicity of memory units, each of which is capable of having data written therein by a processing device, with data being retrieved from the memory units in a nondestructive reading operation.

A computer's memory device stores data of many different kinds. Fundamental programs and machine language algorithms constitute data of an essentially permanent nature; special programs and routines for particular problems constitute data to be retained temporarily while the program is being processed but which can be removed at program termination; computational data generated by the computer as part of its arithmetic operations constitute data of the most ephemeral kind, to be retained only until superseded in the next computation. Because these different kinds of data have differing importance to the computer operation and differing degrees of difficulty of replacement, it is desirable to provide some form of memory protection to prevent the more important memory contents from being destroyed due to program error or hardware failure.

2. Description Of The Prior Art

Various arrangements have been proposed for computer memory protection. One known memory protection system inserts a memory protection bit in every word of the memory contents for individual protection of each word unit. The drawback of this system is that the memory device is inevitably complicated in its structure and in the procedure for designating protection and nonprotection of memory word units.

Another known memory protection system separates the memory device physically into blocks, each of which is protected as a block unit. This system has the drawback that if small blocks of memory are protected, any increases in memory capacity complicate the memory protection structure to a great degree. If large block units are used to reduce the number of blocks, it is difficult to match sizes of blocks and the unit of program to be protected. Wasted memory capacity results.

None of the known memory protection systems has been fully satisfactory in providing memory protection. For example, none is adapted to accommodate both large and small memories, and none is capable of memory protection with a structurally simple protection arrangement, with freedom of protection adjustment to fully utilize memory capacities.

SUMMARY OF THE INVENTION

Objects of the present invention are to provide an improved method and apparatus for protecting the contents of preselected portions of a computer memory device, which offer effective protection, which are simple in structure and operation, and which have a flexibility of arrangement permitting application to both large and small memories and enabling memory capacity to be fully utilized.

In a preferred embodiment of the invention to be described hereinbelow in detail, the memory protection method proceeds by assigning a unique address number to each memory unit, and by designating ranges of address numbers to correspond to memory portions to be protected. Every computer instruction to alter a memory unit, as by writing data therein, is associated with the address number of that unit. When an instruction to alter memory occurs, the associated address number is compared with the designated ranges to determine whether that number is within a protective range and therefore the memory unit is to be protected. In accordance with the comparison, access to a memory unit is either granted to or withheld from the instruction to alter, and the memory unit is thus either altered or preserved depending upon its designation. The protection method, in further detail, designates protection ranges of two different types, one type always denying access, and the other type conditioning access on the setting of a gating signal or device. A third range in the memory is also provided with no protection, so that data may be freely written therein. The ranges of address numbers are established by selecting numbers at the limits or boundaries of the ranges, and storing the numbers in set registers for comparison to the address number associated with a particular instruction.

The apparatus provided by the invention for restricting access to portions of a memory device comprises input means for receiving an address number associated with a memory instruction, means for designating ranges of address numbers to correspond to the portions of the memory device to be protected, and means for comparing the received address numbers with the designated ranges of numbers to determine whether access to the corresponding memory unit is to be given. Means for withholding or granting access to the memory unit respond to the comparing means and control the operation of an instruction on the memory unit. In further detail, the protection apparatus comprises set registers for entering the received address number and for storing the address numbers at the boundaries of said ranges, the ranges separating the memory device into three portions, one always denying access to the memory units therein, one always allowing access to the memory units therein, and one conditioning access upon the state of a settable device such as a flipflop. Digital comparators, such as subtractors, compare the register contents and derive a logic circuit functioning to produce signals corresponding to granting or denying of access to a memory unit.

Other objects, aspects, and advantages of the invention will be pointed out in, or apparent from, the detailed description hereinbelow, considered together with the following drawings.

DESCRIPTION OF THE PREFERRED EMBODIMENT

Figure 1:
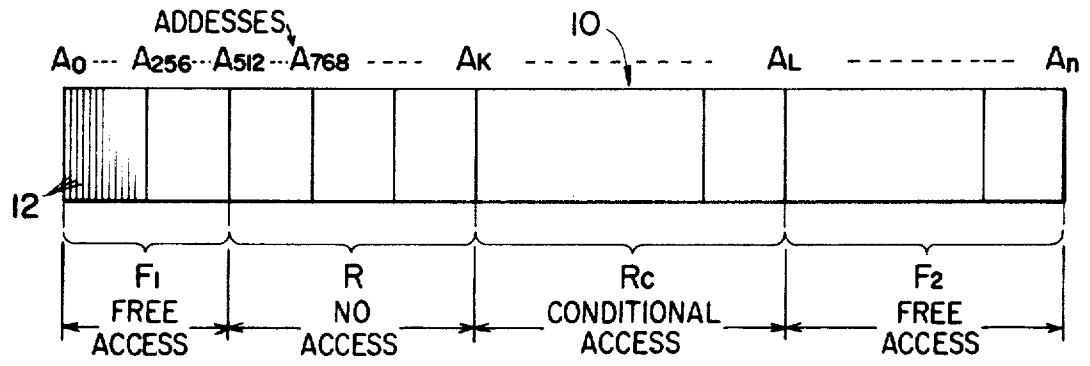
FIG. 1 is a schematic representation of a memory device showing division into protected regions according to the invention.

FIG. 1 illustrates a linear representation of a memory device 10 of conventional type having a large number of memory units 12 whi,ch are shown distributed side by side to form a line of memory units. Each memory unit 12 may comprise a word of information, for example, and the memory device 10 may have a 32,000 word capacity.

Each memory unit 12 is assigned a unique address number A, and as shown in FIG. 1, the address numbers are distributed in a monotonically increasing series $A_0, A_l, \ldots A_n$, with the lowest address number $A_0$ at the left of FIG. 1 and the highest address number $A_n$ at the right. Instructions for reading or writing into specific memory units 12 identify the appropriate memory units by means of the address numbers $A_0$, $A_l$, etc., and locate the memory units in known ways.

According to the present invention, memory protection in memory device 10 is accomplished by designating preselected ranges of address numbers A, and then by employing a decision circuit, described below, to determine if a particular address $A_i$ is within one of the protected ranges, and then to grant or withhold access to that memory unit in response to the decision circuit.

FIG. 1 illustrates typical ranges designated for memory protection. Two ranges F1 and F2 provide free access to the memory units contained therein, with writing access in these ranges not being restricted at all. Range F1 includes address numbers $A_0$ through $A_{511}$, and range F2 includes address numbers $A_L$ through $A_n$. A fixed or restricted range R extends from address number $A_{512}$ to an arbitrarily set address number number $A_{k-1}$, and in this range no access to memory units is permitted. Another range $R_c$, extending from address number $A_k$ to address number $A_{L-1}$, is a conditional range which permits access to memory units only when a condition, such as a particular state of a flip-flop circuit, is present. To relate these ranges to possible memory uses, restricted range R would be appropriate for fundamental language programs, conditionally restricted range $R_c$ would be appropriate for intermediate level programs which are to be protected while the program is run but which can be erased to provide capacity for subsequent programs, and the free ranges F1 and F2 would be appropriate for ephemeral data storage during program computations.

Figure 2:
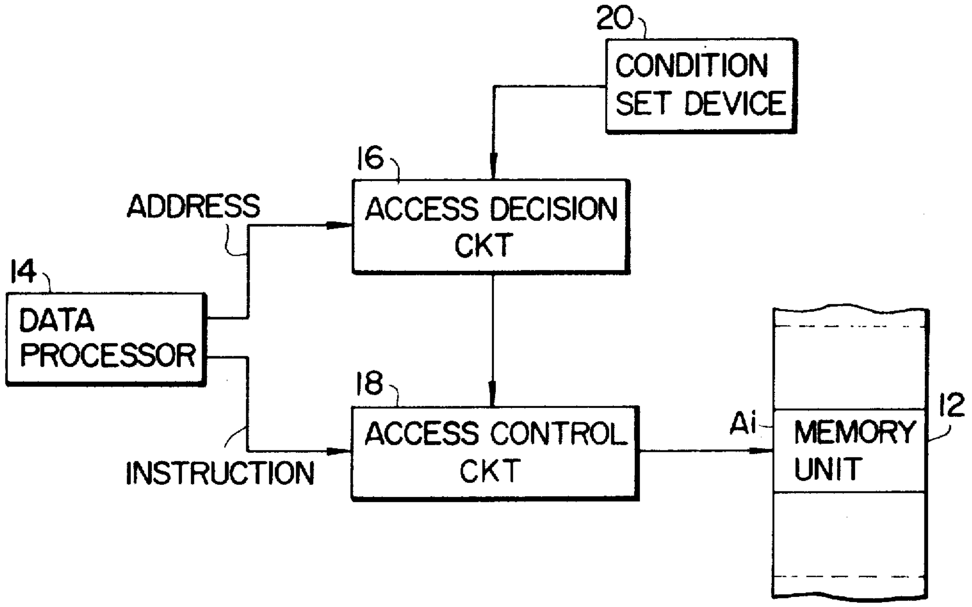
FIG. 2 is a block diagram of memory protection according to the invention.
Figure 3:
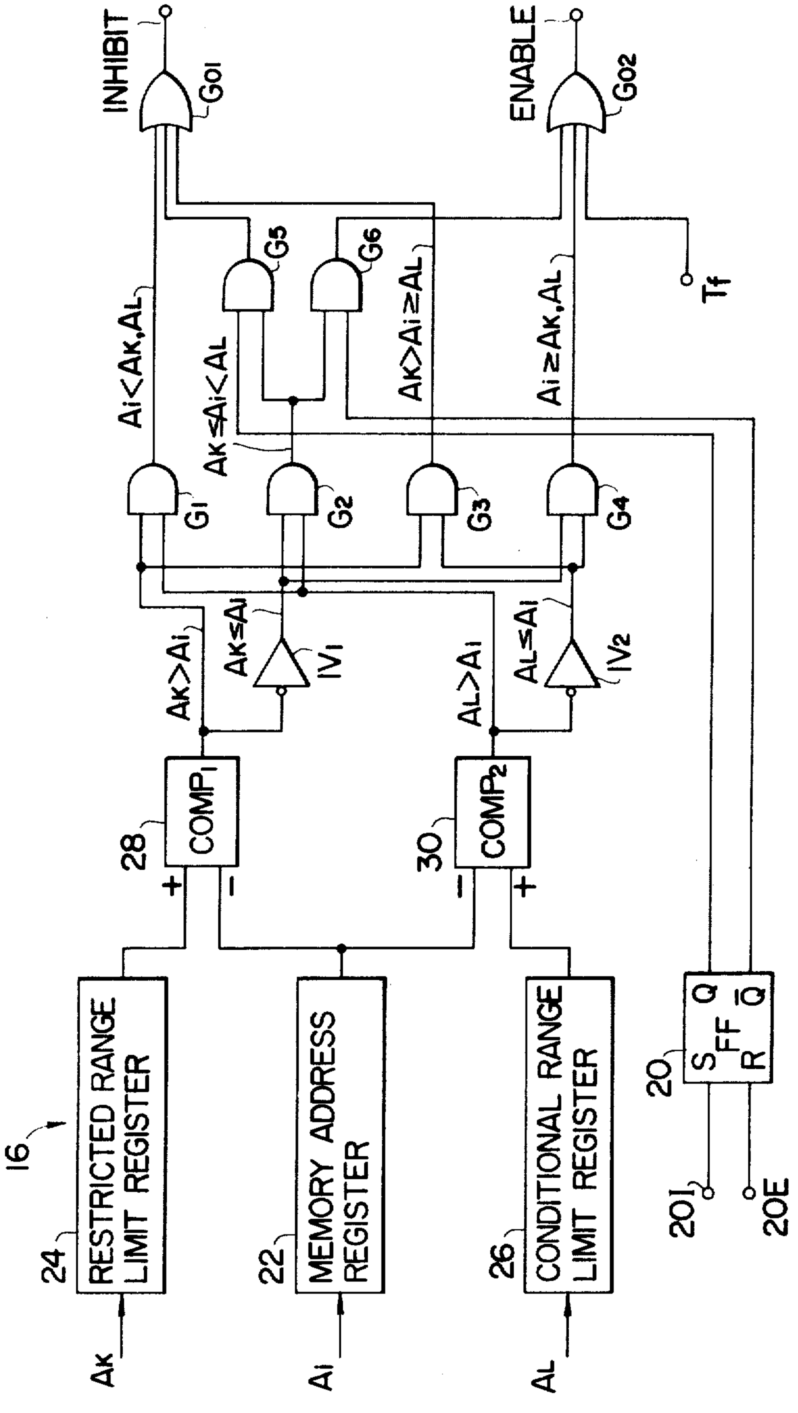
FIG. 3 is a schematic diagram of circuitry arranged to provide memory protection according to the invention.

The apparatus which protects memory device 10 in accordance with the designated ranges F1, F2, R, and $R_c$, is shown in FIGS. 2 and 3. The broad context in which memory protection is provided is shown in FIG. 2, in which a data processor 14 generates a memory-altering instruction to be applied to alter a memory unit 12 having address number $A_i$. The instruction, for example, may be of the form "write data X at memory address $A_i$". According to the invention, the memory address $A_i$ associated with such an instruction is processed by an access decision circuit 16 which determines whether the address $A_i$ falls within one of the protected ranges R or $R_c$, and which governs accordingly an access control circuit 18. The access control circuit 18, acting as a gate, either withholds or grants access of the memory altering instruction to the memory unit at address $A_i$, thereby providing the desired selective memory protection of the invention. For addresses $A_i$ which fall within conditionally restricted range $R_c$, access decision circuit 16 is further governed by a condition set device 20 which determines whether access for this range is to allowed or denied.

FIG. 3 illustrates in greater detail the circuitry which forms access decision circuit 16. The address $A_i$, which is associated with a memory altering instruction, is entered in a memory address register 22. The address number $A_k$, which forms the upper bound or limit of the restricted range R, is entered in restricted range limit register 24. Similarly, the address number $A_L$, which is the upper limit address of conditionally restricted range $R_c$, is entered in conditional range limit register 26. Typically, address numbers $A_k$ and $A_L$ are multiples of 256 to provide rapid computation by eliminating the additional seven binary digits which would be needed to describe the number in arbitrary detail. The address numbers $A_k$ and $A_L$ are set in the registers 24 and 26 either by program means or by particular restricted controls.

The address number $A_i$is compared with the limits $A_k$and $A_L$ by comparing the contents of registers 22, 24, 26 with digital comparators 28 and 30, which may be digital subtractors. Memory address register 22 is connected to the negative inputs of comparators 28 and 30, while the range limit registers 24 and 26 are connected to the respective positive input terminals of the comparators. Accordingly, comparator 28 produces an output whenever $A_k > A_i$, and comparator 30 will have an output whenever $A_L > A_i$. Inverters $IV_1$ and $IV_2$ connected to the outputs of comparators 28 and 30 also provide outputs for the relationships $A_k \leq A_i$, and $A_L \leq A_i$ respectively. Outputs corresponding to the four relationships of memory address numbers are paired at the inputs of AND gates G1 through G4 as shown in FIG. 3. AND gate G1 has an output when address number $A_i$ is less than both limits $A_k$ and $A_L$, thus lying in the ranges F1 or R, and its output leads to an OR gate $G_{01}$ whose output signifies to access control circuit 18 that access is to be inhibited or withheld. Gate G3 has an output whenever $A_k > A_i \geq A_L$ (to accommodate the special case when $A_L$ is set in register 26 as a number less than address number $A_k$), indicating presence in range F1 or R, and therefore being connected to inhibit gate $G_{01}$.

Gate G4 has an output when $A_i \geq A_k$ and $A_i \geq A_L$, indicating presence in free range F2, and the output leads to a second OR gate $G_{02}$ whose output signifies to access control circuit 18 that access is to be granted or enabled.

Gate G2 has an output whenever address number $A_i$ lies between the limits $A_k$ and $A_L$, indicating presence within the conditionally restricted range $R_c$. To test for the presence of the conditions granting or withholding access, gate G2 is connected through AND gates G5 and G6, respectively to OR gates $G_{01}$ and $G_{02}$. The other inputs to AND gates G5 and G6 are obtained from condition set device 20, shown in FIG. 3 as a flip-flop circuit having mutually exclusive outputs set by inputs 20I and 20E which respectively condition the outputs to provide conduction either through gates G5 and $G_{01}$ to inhibit access, or through gates G6 and $G_{02}$ to enable access.

The address in free range F1, which are chosen to be free because they are easily accessible, are treated differently by access decision circuit 16. For addresses within free range F1, a signal is applied to a special input terminal $T_f$ of OR gate $G_{02}$ to provide direct access, the signals at the terminal $T_f$ bypassing the comparisons made by decision circuit 16 and directly ordering that access be given.

The memory protection method and apparatus described above do not require hardware of structural complexity as shown by the simplicity of the circuit of FIG. 3. Certain additional simplifications can be made; for example, the flip-flop circuit forming condition set device 20 may comprise one bit of register 24 or 26. The memory protection method and apparatus are also applicable by reason of their flexibility to both large and small capacity memories since the range limits $A_k$ and $A_L$ can be arbitrarily set in registers 24 and 26. The freedom with which these limits can be set further enables a memory of restricted capacity to be fully utilized with the degree of memory protection desired.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. A method for protecting the contents of selected portions of a memory device formed of a multiplicity of memory units, said method comprising:

assigning a unique address number to each memory unit, designating three contiguous ranges of address numbers to correspond to memory portions to be protected, said ranges being designated by selecting address numbers at the limits of said ranges, said ranges of address numbers including a first range to which access is always withheld, a second range to which access is conditioned upon the setting of a control device, and a third range to which access is always granted, setting said control device to condition said second range to grant or withhold access to the corresponding memory portion;

associating every instruction for altering a memory unit with the address number of that unit, as each instruction to alter memory is presented, comparing the address number associated with the memory unit with said designated ranges to determine whether that address number is within a protected range and therefore the corresponding memory unit to be protected, and withholding or granting access to said memory units in response to and in accordance with said comparison, thereby protecting the contents of portions of the memory device.

2. A method for protecting memory con-tents as claimed in claim 1 wherein said three ranges are designated by selecting two address numbers to act as limits between said ranges, storing said limit numbers in two set registers, and wherein said address numbers are entered in a register and compared in digital comparing means with the limit numbers in said registers, and gating the outputs of the digital comparing means to generate signals to correspond to withholding or granting access to the memory units.

3. An apparatus for restricting access to preselected portions of a memory device formed of a multiplicity of memory units, wherein each memory unit is assigned a unique address number to be associated with memory instructions relating to that memory unit, said apparatus comprising:

input means for receiving an address number associated with a memory instruction, means for designating three contiguous ranges of address numbers to correspond to the portions of the memory device to be protected, said ranges of address numbers including a first range to which access is always withheld, a second range to which access is conditioned upon the setting of a control device, and a third range to which access is always granted, said range designating means comprise means for registering two address numbers to act as limits between said ranges, and means for coupling the address numbers with said two registered limit numbers to determine whether access is to be given to the corresponding memory unit, and means for withholding or granting access to said memory unit in response to said comparing means.

4. An apparatus for protecting portions of a memory device as claimed in claim 3 wherein said range designating means is settable to provide preselected range boundaries, whereby said ranges can provide desired limits of memory protection.

* * * * *